United States Patent
Hung et al.

[19]

[11] Patent Number: 5,810,306
[45] Date of Patent: Sep. 22, 1998

[54] SHAPE RETAINING FLEXIBLE CONNECTOR

[75] Inventors: John Hung, Quingpu, China; Norman L. Matthew, Highland Park; Vince Alesi, Bartlett, both of Ill.

[73] Assignee: Custom Accessories, Inc., Niles, Ill.

[21] Appl. No.: 650,137

[22] Filed: May 17, 1996

[51] Int. Cl.$^6$ .................................................. F21M 3/18
[52] U.S. Cl. .................. 248/274.1; 248/160; 248/276.1; 362/419; 403/223
[58] Field of Search ..................................... 248/160, 104, 248/274.1, 276.1; 403/220, 223, 291; 362/285, 287, 419

[56] References Cited

U.S. PATENT DOCUMENTS

| | | |
|---|---|---|
| D. 282,011 | 12/1985 | Fackert . |
| 314,440 | 3/1885 | Eames . |
| 428,023 | 5/1890 | Schoff . |
| 790,971 | 5/1905 | Nicholls . |
| 809,977 | 1/1906 | O'Brien . |
| 912,308 | 2/1909 | Grimler ................................... 248/160 |
| 936,379 | 10/1909 | Stevens ................................... 248/160 |
| 1,250,064 | 12/1917 | Whims ..................................... 248/160 |
| 1,255,577 | 2/1918 | Berry . |
| 1,276,117 | 8/1918 | Riebe . |
| 1,340,818 | 5/1920 | Brinkman . |
| 1,731,322 | 10/1929 | Riddle . |
| 1,783,278 | 12/1930 | Brady . |
| 1,911,470 | 5/1933 | Rosner . |
| 2,382,966 | 8/1945 | Arens . |
| 2,510,198 | 6/1950 | Tesmer ................................ 248/160 X |
| 2,640,502 | 6/1953 | Powers . |
| 2,723,426 | 11/1955 | Pelley . |
| 2,759,765 | 8/1956 | Pawley . |
| 3,168,274 | 2/1965 | Street ................................... 248/160 X |
| 3,266,059 | 8/1966 | Stelle . |
| 3,534,389 | 10/1970 | Bernard et al. . |
| 3,929,164 | 12/1975 | Richter . |
| 4,238,816 | 12/1980 | Merlo . |
| 4,305,560 | 12/1981 | Ban . |
| 4,307,754 | 12/1981 | Muratsubaki . |
| 4,367,967 | 1/1983 | Albert, Jr. . |
| 4,393,728 | 7/1983 | Larson et al. ........................ 248/160 X |
| 4,463,779 | 8/1984 | Wink et al. . |
| 4,692,850 | 9/1987 | LeDoux . |
| 4,842,174 | 6/1989 | Sheppard et al. . |
| 4,885,667 | 12/1989 | Selden . |
| 4,912,612 | 3/1990 | Giorgi . |
| 4,949,927 | 8/1990 | Madocks et al. ..................... 248/276.1 |
| 5,263,646 | 11/1993 | McCauley . |
| 5,442,528 | 8/1995 | Vandenbelt . |
| 5,449,206 | 9/1995 | Lockwood . |

FOREIGN PATENT DOCUMENTS

| | | |
|---|---|---|
| 921384 | 5/1947 | France . |
| 854100 | 8/1952 | Germany ............................... 248/160 |
| 2806037 | 8/1979 | Germany ............................... 248/160 |
| 976640 | 12/1964 | United Kingdom . |

*Primary Examiner*—Derek J. Berger
*Attorney, Agent, or Firm*—Dick and Harris

[57] ABSTRACT

A shape retaining flexible connector apparatus for supporting flashlights, lamps, etc., is provided. The shape retaining flexible connector apparatus includes a formable support member, one or more joint forming members associated with the support member and a cover member.

11 Claims, 1 Drawing Sheet

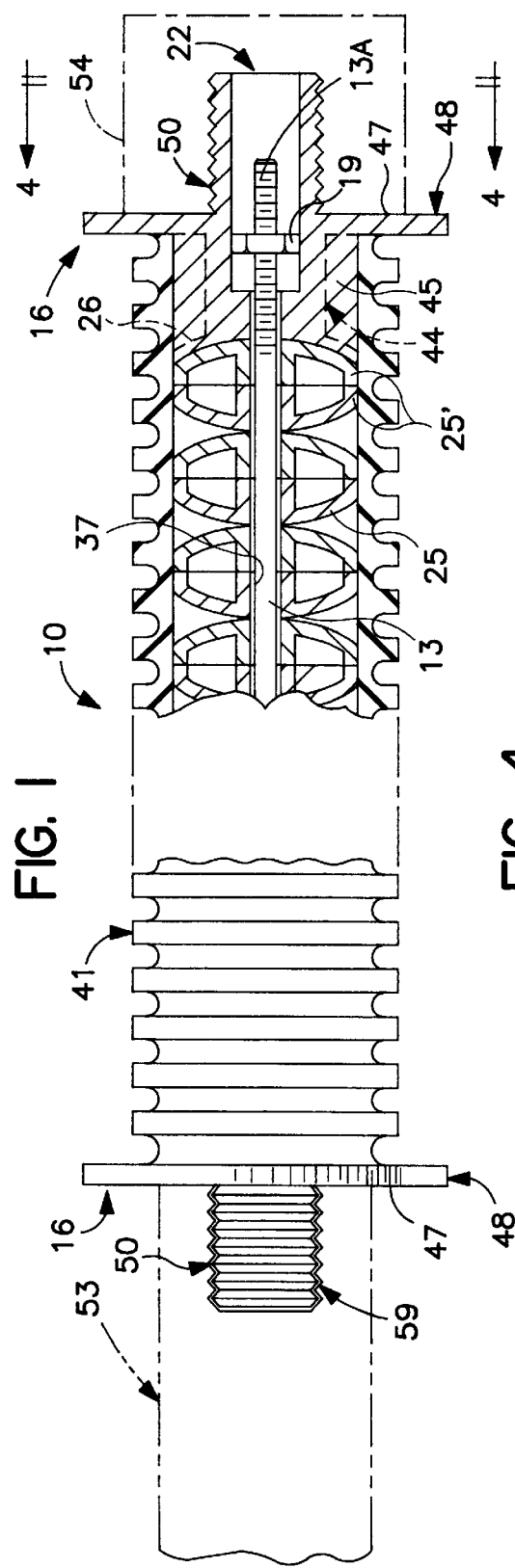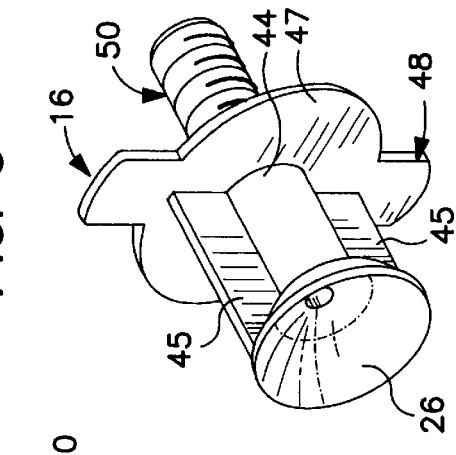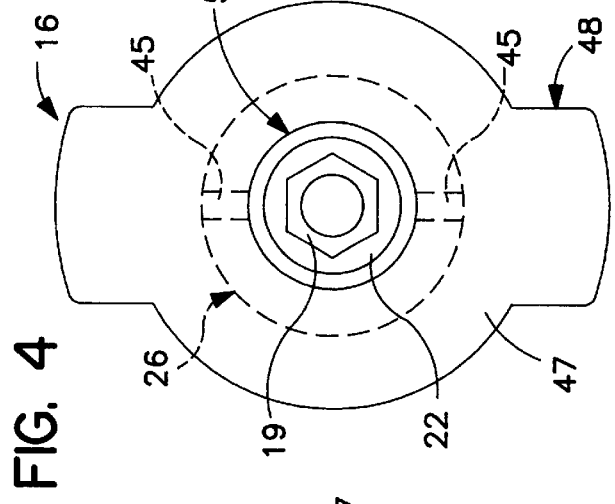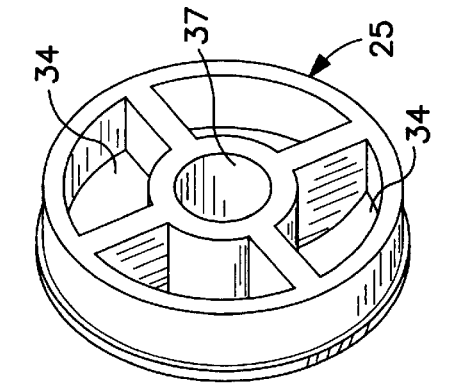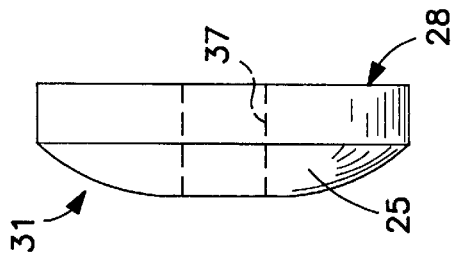

SHAPE RETAINING FLEXIBLE CONNECTOR

BACKGROUND OF THE INVENTION

1. Field of the Invention

The present invention relates to structures such as hoses, tubes, conduits, connectors and the like, which can be bent or formed into various shapes and which are configured to retain the bent shape until subsequently repositioned.

2. The Prior Art

Elongated conduit or tubular apparatus, having the characteristic of being bendable into a plurality of shapes and thereafter retaining the bent shape until subsequent repositioning, are known. Such apparatus are used for such diverse purposes as positioning a fluid conduit so that a flow of fluid exiting the conduit can be aimed in a particular direction, utilizing the flexible conduit as a support for other articles, such as lamps, mirrors, radios, fans, etc., so that the articles can be positioned in unusual or otherwise difficult locations. Such apparatus are often typically referred to as "goose neck" structures.

Some goose neck apparatus are formed through the provision of a helically wound metal tube, which may or may not include in combination, a helically wound coil. The construction of such a helically wound tube and/or coil permits a certain amount of flexibility and capacity for flexibly holding relatively large loads. Such structures are illustrated in LeDoux, U.S. Pat. No. 4,692,850 and Shepherd et al., U.S. Pat. No. 4,842,174. Such helically wound metal tube type structures can have the drawback that the amount of flexibility may be compromised in order to provide the requisite load carrying capacity.

Other types of goose neck structures are known which employ a succession of ball and socket joints. Such apparatus are can be used not only for the transport of fluids, but instead can also be used as support structures for lamps, fans, radios, magnifying lenses, etc. Examples of such ball and socket type goose neck supports may be found in Lockwood, U.S. Pat. No. 5,449,206.

However, such ball and socket type goose neck apparatus may have the drawback of being relatively complex and costly to manufacture and assemble. In addition, in certain ones of such ball and socket systems, such ball portions may pop out of their respective sockets if they are pivoted beyond a certain point.

It would be desirable to provide a flexible support having the capacity to retain its position when placed there until repositioned, yet is relatively easy and inexpensive to manufacture and assemble.

It would also be desirable to provide such a shape retaining flexible connector that is of relatively simple configuration. It would further be desirable to provide a shape retaining flexible connector that has both the capacity for substantial load bearing and high flexibility.

These and other objects of the invention will become apparent in light of the present specification and drawings.

SUMMARY OF THE INVENTION

The present invention comprises a shape retaining, flexible connector apparatus, operably configured to be positioned by a user into a plurality of positions for the facilitated support of one or more articles positioned thereon or proximate one or both of its ends thereby.

The shape retaining, flexible connector apparatus comprises an elongated, flexible, shape-retaining support member. At least one joint forming member is disposed along the elongated, flexible, shape-retaining support member, for providing for the facilitated and controlled positioning of the support member. Means are provided for maintaining the at least one joint forming member in position along the support member. Means are also provided for attaching the one or more articles to the flexible connector apparatus.

In one embodiment of the invention, the flexible connector apparatus also comprises means for covering the support member and the at least one joint forming member, toward providing for the facilitated grasping and positioning of the support member. The covering means preferably comprises a flexible tube member.

In an embodiment of the invention, the at least one joint forming member comprises at least one substantially disk-shaped member, having an aperture extending therethrough, through which aperture the support member extends. The at least one substantially disk-shaped member preferably comprises a plurality of substantially disk-shaped members. The substantially disk-shaped members are positioned substantially adjacent one another along the support member. At least two adjacent ones of the plurality of substantially disk-shaped members have respective juxtaposed curved convex surfaces, configured so that upon flexing of the support member, the respective juxtaposed curved convex surfaces are capable of substantially engaging each other in relative rolling movement, to define a joint.

At least one of the substantially disk-shaped members is fabricated from a material which is softer than another material from which at least one other of the substantially disk-shaped members is fabricated.

The means for maintaining the joint forming members in position along the support member comprises a stop member, positioned at each end of the support member, for precluding the disk-shaped members from being removed from the support member.

The means for attaching the one or more articles to the flexible connector apparatus comprises at least one attachment member, affixed to at least one of the ends of the support member, and configured to engage at least one of the one or more articles.

The support member preferably comprises a metal wire.

The one or more articles is, in one embodiment of the invention, a lamp apparatus.

BRIEF DESCRIPTION OF THE DRAWINGS

FIG. 1 is a side elevation, partially in section, of the shape retaining flexible connector of the present invention.

FIG. 2 is an end elevation thereof.

FIG. 3 is a perspective view of a disk.

FIG. 4 is a side elevation thereof.

FIG. 5 is a perspective view of the end fitting for the shape retaining flexible connector.

DETAILED DESCRIPTION OF THE INVENTION

While this invention is susceptible of embodiment in many different forms, there is shown in the drawings and will be described in detail herein, a specific embodiment, with the understanding that the present invention is to be considered as an exemplification of the principles of the invention, and is not intended to limit the invention to the embodiment illustrated.

One embodiment of the flexible shape retaining coupler is illustrated in FIGS. 1–4. Shape retaining flexible coupler 10 includes a wire 13 which preferably in one embodiment of the invention is a heavy gauge wire fabricated from aluminum or copper or similar strong highly flexible and ductile metal, a wire fabricated from which can be repeatedly bent and straightened without failing from fatigue. Wire 13 preferably has a circular cross section, but may alternatively have a polygonal cross-section, or may have longitudinal grooves formed along its length. A fitting 16 is attached to each end of wire 13. Any suitable manner of affixation of the wire 13 to fitting 16 may be employed. A preferred method is to affix each fitting 16 through the use of a nut 19 which is received within a recess 22 and configured to be threadably engaged with an end of wire 13. Alternatively, the end 13A of wire 13 can be enlarged or flattened by crimping or the like, so as to exceed the diameter of bore 37. A corresponding method is likewise used proximate the other end of wire 13 to affix the other end of the wire 13 to a corresponding fitting 16.

A plurality of spacer members 25, 25', are positioned along wire 13. Each spacer member 25 preferably is in the form of a disk (See FIG. 3 and FIG. 4), having a substantially circular cross-section. However, other cross-sections, such as squares or polygons, may be used, if desired. Each disk 25 preferably has a substantially flat face 28 (as seen in side elevation) and a substantially rounded face 31. Alternatively, the face opposite the flat face may be in the form of a shallow cone. In a still further alternative embodiment, one or both sides of each and every disk may be rounded or conical. Although each disk 25 may be formed as a completely solid article, in order to reduce weight and/or save material, each disk 25 may be molded, in at least a partially hollow manner, preferably from a plastic material, and having recesses 34. Other materials may be used to form disks 25, 25', including dense closed-cell foam, nylon, etc. Each disk 25 has a bore 37 extending completely there through. In the embodiment of FIGS. 1–4, the disks 25 are arranged in alternating fashion along wire 13 so that successive pairs of disks have their flat faces 28 against one another. In a preferred embodiment of the invention, the pairs of disks 25 are positioned along wire 13 so that there is a minimum amount of free space between any given pair of disks. In an alternative embodiment, wire 13 is covered by one or more cylindrical foam members along the length of wire 13, instead of disks 25 and 25'.

A cover member 41, preferably in the form of an outwardly ribbed or corrugated substantially cylindrical tube or bellows structure, and preferably fabricated from a durable yet flexible plastic material, is fitted over wire 13 and disks 25, for covering the disks 25 and providing a cover over such internal components, a more uniform surface, and a more easily gripped surface. In an alternative embodiment, in which the disks have square or polygonal cross-sections, cover member 41 would similarly be preferably provided with a generally square or polygon cross-section. A portion of cover 41 has been shown in phantom in the illustration of FIG. 1 in order to more readily disclose the structure underneath. It is to be understood that in a preferred embodiment of the invention, cover 41 extends substantially the entire length of apparatus 10 from the fitting 16 at one end to the corresponding fitting 16 at the opposite end, although in other embodiments, the cover 41 may not extend the complete length of apparatus 10, but instead may fall short of one or both of the ends. The pattern of ribs on cover member 41 is not limited to that illustrated, but should have a configuration which is simple to manufacture according to conventional plastic molding and/or extrusion techniques so as to provide a degree of substantially uniform flexibility along its length, when apparatus 10 is either bent or straightened into a desired position. The material from which cover 41 is made should be a material having appropriate characteristics of suppleness, resilience and flexibility, such that when apparatus 10 is bent or straightened, creases (apart from those preformed corrugations), cracks, dimples and the like are substantially precluded, and the cover should be sized and configured so that it will not "creep" relative to the wire 13.

Each fitting 16 comprises a shank 44 (preferably having a diameter which is approximately the same as that of threaded portion 50) through which the wire 13 passes, a flange 47 (which may include tabs 48) and a threaded portion 50. Lengthwise, radially extending fins 45, may be provided, as in the preferred embodiment of FIGS. 1–4, extending from flange 47 to cup 26, and extending radially outward a distance approximately the same as the radius of cup 26, to provide strength to fitting 16 and/or to provide surfaces against which assembly tools may bear. As previously discussed, bore 22 is preferably formed in threaded portion 50 for receiving a nut to which wire 13 is threadably engaged, in the preferred embodiment. As stated, each fitting additionally includes a cup 26, which has a concave surface which is configured substantially to nest conformably with the end most disk 25', at each end of apparatus 10. At least one of the last two conjoining disks 25' is preferably fabricated from a somewhat softer, preferably plastic, material than the remaining disks 25 which are interposed between the disks 25'. This preferably softer material facilitates in the nesting and conforming of the cup 26 to the end most disk 25'. This fitting occurs at a place of highest stress in the apparatus and accordingly some additional resiliency at the interconnection between the end most disk and the fitting 16 is believed to be advantageous, although not absolutely necessary for the functioning of the flexible connector.

Threaded portion 50 is provided to give a facilitated means of attachment of fitting 16 to an article 53 having a corresponding threaded portion 59 capable of securely receiving threaded portion 50. Other forms of attachment, such as bayonet mounts, or snap-fit mounts, could also be used to attach fitting 16 to article 53. Article 53 may be, for example, a flashlight unit, a fan, a radio, a television, a CD player, a mirror, a magnifying lens structure or any other device for which a flexible, yet shape-retaining, support may be desired. Moreover, the other end of coupler 10 may be similarly attached to a second such article 54 or a base.

The foregoing description and drawings merely serve to illustrate the invention and the invention is not limited thereto accept insofar as the appended claims are so limited, as those skilled in the art to have the disclosure before them will be able to make modifications and variations therein without departing from the scope of the invention.

We claim:

1. A shape retaining, flexible connector apparatus, operably configured to be positioned by a user into a plurality of positions for the facilitated support of one or more articles positioned thereon or proximate one or both of its ends thereby, the shape retaining, flexible connector apparatus comprising:

an elongated, flexible, shape-retaining support member, having a first and a second end and further having a longitudinal axis, a transverse axis and a vertical axis perpendicular thereto and configured for selectable flexible articulation into one of a plurality of positions between said longitudinal axis, said transverse axis and said vertical axis;

said support member being further configured for substantial maintenance of said one position, once positioned;

at least three joint forming members, disposed between said first and second ends of said shape-retaining support member along the longitudinal axis of the elongated, flexible, shape-retaining support member, for providing for the facilitated and controlled positioning of the support member;

means for maintaining the joint forming members in position along the support member; and means for attaching the one or more articles to the flexible connector apparatus.

2. The flexible connector apparatus according to claim 1, further comprising means for covering the support member and the joint forming members for providing for facilitated grasping and positioning of the support member.

3. The flexible connector apparatus according to claim 2, wherein the covering means comprises a flexible tube member.

4. The flexible connector apparatus according to claim 1, wherein the joint forming members comprise substantially disk-shaped members, having aperture extending therethrough, through which apertures the support member extends.

5. The flexible connector apparatus according to claim 4, wherein the disk-shaped members of substantially are positioned substantially adjacent one another along the support member.

6. The flexible connector apparatus according to claim 5, wherein at least two adjacent ones of the substantially disk-shaped members have respective juxtaposed curved convex surfaces, configured so that upon flexing of the support member, the respective juxtaposed curved convex surfaces are capable of substantially engaging each other in relative rolling movement, to define a joint.

7. The flexible connector apparatus according to claim 4, wherein the means for maintaining the joint forming members in position along the support member comprises a stop member, positioned at each end of the support member, for precluding the disk-shaped members from being removed from the support member.

8. The flexible connector apparatus according to claim 1, wherein the means for attaching the one or more articles to the flexible connector apparatus comprises at least one attachment member, affixed to at least one of the ends of the support member, and configured to engage at least one of the one or more articles.

9. The flexible connector apparatus according to claim 1, wherein the support member comprises a metal wire.

10. A shape retaining, flexible connector apparatus, operably configured to be positioned by a user into a plurality of positions for the facilitated support of one or more articles positioned thereon or proximate one or both of its ends thereby, the shape retaining, flexible connector apparatus comprising:

an elongated, flexible shape-retaining support member;

at least one joint forming member, disposed along the elongated, flexible, shape-retaining support member, for providing for the facilitated and controlled positioning of the support member;

means for maintaining the at least one joint forming member in position along the support member;

means for attaching the one or more articles to the flexible connector apparatus;

said at least one joint forming member comprising at least one substantially disk-shaped member, having an aperture extending therethrough, through which aperture the support member extends; and the at least one substantially disk-shaped member is fabricated from a material which is softer than another material from which at least one other of the substantially disk-shaped members is fabricated.

11. A lamp apparatus, in combination with a shape retaining, flexible connector apparatus, operably configured to be positioned by a user into a plurality of positions for the facilitated support of one or more articles positioned thereon or proximate one or both of its ends thereby, wherein the shape retaining, flexible connector apparatus comprises:

an elongated, flexible, shape-retaining support member, having a longitudinal axis, a transverse axis and a vertical axis perpendicular thereto and configured for selectable flexible articulation into one of a plurality of positions between said longitudinal axis, said transverse axis and said vertical axis;

said support member being further configured for substantial maintenance of said one position, once positioned;

at least one joint forming member, disposed along the elongated, flexible, shape-retaining support member, for providing for the facilitated and controlled positioning of the support member;

means for maintaining the at least one joint forming member in position along the support member; and means for attaching the one or more articles to the flexible connector apparatus.

* * * * *